United States Patent
Kalkbrenner et al.

(10) Patent No.: US 10,401,149 B2
(45) Date of Patent: Sep. 3, 2019

(54) METHOD FOR DETERMINING THE THICKNESS OF A SPECIMEN HOLDER IN THE BEAM PATH OF A MICROSCOPE

(71) Applicant: Carl Zeiss Microscopy GmbH, Jena (DE)

(72) Inventors: Thomas Kalkbrenner, Jena (DE); Jörg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/222,177

(22) Filed: Dec. 17, 2018

(65) Prior Publication Data

US 2019/0186895 A1    Jun. 20, 2019

(30) Foreign Application Priority Data

Dec. 18, 2017  (DE) .................... 10 2017 223 014

(51) Int. Cl.
*G01B 11/06* (2006.01)
*G02B 21/34* (2006.01)

(52) U.S. Cl.
CPC .............. *G01B 11/06* (2013.01); *G02B 21/34* (2013.01)

(58) Field of Classification Search
CPC ....... G01B 11/06; G01B 11/14; G01B 11/065; G01B 9/02; G01B 9/04; G02B 21/26; G02B 21/34

See application file for complete search history.

(56) References Cited

U.S. PATENT DOCUMENTS

| 3,305,294 A | 2/1967 | Alvarez |
| 4,826,321 A * | 5/1989 | Coates ................. G01B 11/065 356/369 |

(Continued)

FOREIGN PATENT DOCUMENTS

| DE | 102014002584 A1 | 7/2015 |
| DE | 202016008115 U1 | 3/2017 |

(Continued)

OTHER PUBLICATIONS

German Search Report dated Aug. 23, 2018.

(Continued)

*Primary Examiner* — Jamil Ahmed
(74) *Attorney, Agent, or Firm* — Duane Morris LLP

(57) ABSTRACT

A method for capturing image data and for determining the thickness of a specimen holder in the beam path of a microscope. The specimen holder is transparent to illumination radiation and embodied to receive a specimen. The specimen holder, which has a first side face and a second side face, is arranged in a specimen plane and the first side face and second side face of the specimen holder are aligned parallel to the specimen plane. At least one beam of the illumination radiation is directed onto the aligned specimen holder along a first optical axis at a first illumination angle and at least two measured values of a reflected component of the illumination radiation or at least two measurement values of a detection radiation caused by the illumination radiation are captured. Depending on the at least two captured measurement values, a spacing of the first and second side face in relation to one another in the direction of the Z-axis is established as a thickness.

11 Claims, 7 Drawing Sheets

(56) References Cited

U.S. PATENT DOCUMENTS

| | | | |
|---|---|---|---|
| 2006/0098213 A1 | 5/2006 | Itoh et al. | |
| 2012/0327208 A1 | 12/2012 | Higaki et al. | |
| 2013/0141562 A1 | 6/2013 | Yano et al. | |
| 2013/0329233 A1* | 12/2013 | Cohen | G01B 9/04 356/624 |
| 2014/0063224 A1 | 3/2014 | Suzuki | |
| 2015/0293342 A1 | 10/2015 | Kawashima | |
| 2016/0048967 A1 | 2/2016 | Mitzkus et al. | |

FOREIGN PATENT DOCUMENTS

| | | |
|---|---|---|
| DE | 102016212019 A1 | 1/2018 |
| EP | 1970746 A1 | 9/2008 |
| EP | 1988417 A1 | 11/2008 |
| WO | 2018002224 A2 | 1/2018 |

OTHER PUBLICATIONS

McGorty, et al.; "Open-top selective plane illumination microscope for conventionally mounted specimens"; Optics Express 2015; 23(12):16142-16153.

Gutierrez-Vega, J.C., et al.; "Experimental demonstration of optical Mathieu beams"; Optics Communications 2001; 195:35-40.

Peli, Eli; "Contrast in complex images"; Journal of the Optical Society of America A 1990; 7(10):2032-2040.

De, Kanjar and Masilamani, V.; "Image sharpness measure for blurred images in frequency domain"; Procedia Engineering 2013; 64:149-158.

Zhang, Nien Fan, et al.; "Image sharpness measurement in the scanning electron microscope—Part III"; Scanning 1999; 21:246-252.

Partial European Search Report dated Apr. 16, 2019 with English translation.

\* cited by examiner

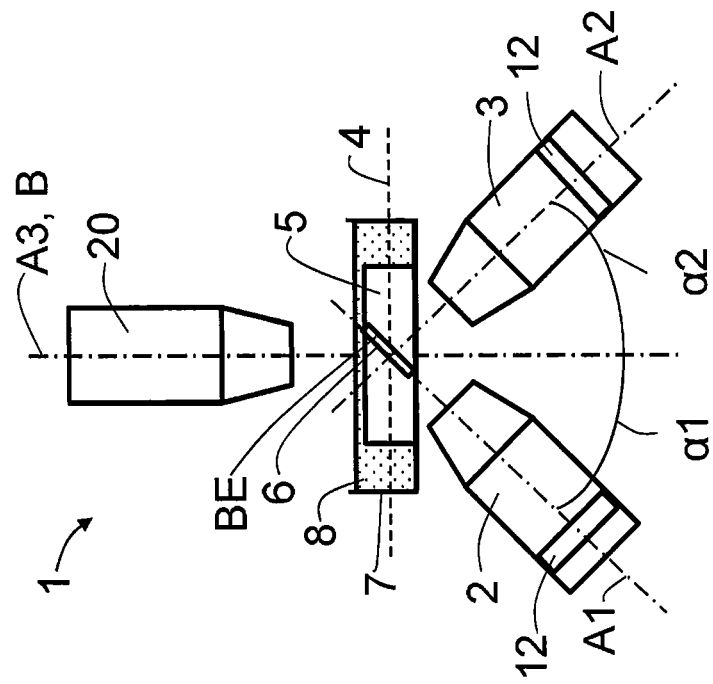
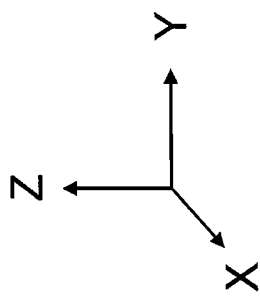
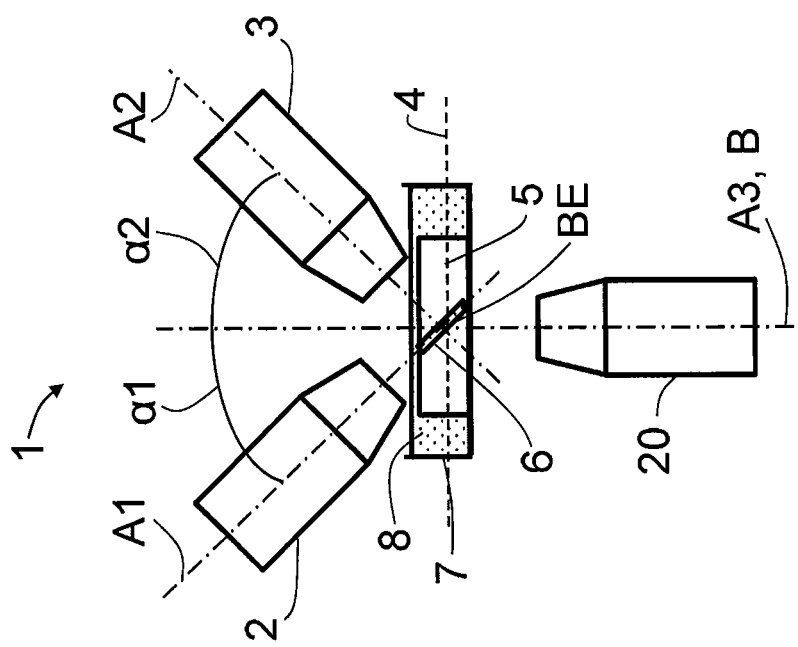
Fig. 1a Prior art
Fig. 1b Prior art

METHOD FOR DETERMINING THE THICKNESS OF A SPECIMEN HOLDER IN THE BEAM PATH OF A MICROSCOPE

RELATED APPLICATIONS

The present application claims priority benefit of German Application No. DE 10 2017 223 014.2 filed on Dec. 18, 2017, the contents of each are incorporated by reference in their entirety.

FIELD OF THE INVENTION

The invention relates to a method for determining the thickness of a specimen holder in the beam path of a microscope.

BACKGROUND OF THE INVENTION

One of the main applications of light sheet microscopy lies in imaging midsized specimens, for example organisms, with dimensions of several 100 µm up to a few millimeters. As a rule, these specimens are embedded in agarose and arranged in a glass capillary. For the purposes of examining the specimen, the glass capillary is introduced into a water-filled specimen chamber and the agarose with the specimen is pressed a little out of the capillary. The specimen is illuminated by a light sheet. The fluorescence that is excited in the specimen and that emanates from the latter is imaged onto a detector, in particular a camera, by means of a detection objective, which is perpendicular to the light sheet and consequently also perpendicular to the light sheet optical unit.

In accordance with the prior art, a layout of a microscope 1 for light sheet microscopy (SPIM layout; single plane illumination microscopy) comprises an illumination objective 2 with a first optical axis A1 and a detection objective 3 with a second optical axis A2 (also referred to as SPIM objectives below) which are each directed onto the specimen plane 4 from above at an angle of 45° in relation to a specimen plane 4 and at right angles in relation to one another (see FIG. 1a). A specimen 5 arranged in the specimen plane 4 is situated, for example, on the base of a specimen holder 7 embodied as a petri dish. The specimen holder 7 is filled with a liquid 8, for example water, and the two SPIM objectives 2, 3 are immersed in the liquid 8 during the application of the light sheet microscopy (not shown). The specimen plane 4 extends in an XY plane spanned by the X-axis X and the Y-axis Y of a Cartesian coordinate system. The first optical axis A1 and the second optical axis A2 extend in a plane YZ spanned by the Y-axis Y and the Z-axis Z of the Cartesian coordinate system.

This approach offers the advantage of a high resolution in the axial direction since a thin light sheet 6 may be produced by means of the illumination objective 2 and possibly further optically effective elements. Smaller specimens 5 may be examined on account of the higher resolution. Additionally, the bothersome background fluorescence is significantly reduced and the signal-to-noise ratio is improved as a result thereof.

In order to facilitate simpler specimen preparation in standard specimen containers such as e.g. multiwell plates, it is possible to maintain the 45° configuration but have the two SPIM objectives 2, 3, in an inverted arrangement, be directed into the specimen plane 4 from below through the transparent base of the specimen holder 7 (FIG. 1b). In this arrangement, it is necessary to correct the aberrations caused by the specimen holder 7 which is inclined relative to the optical axes A1 and A2 and present in the form of a cover slip by using special optical elements. The specimen 5 arranged in the specimen plane 4 is illuminated through the base of the specimen holder 7 and excited fluorescence of the specimen 5 is detected. It is possible to use specimen holders 7 such as e.g. multiwell plates, Petri dishes and/or object supports and contamination of the specimens 5, in particular in the case of high-throughput screening, may be avoided.

Further technical difficulties occur if, e.g., so-called Alvarez plates are arranged as correction elements 12 (FIG. 1B) in the beam path of the illumination objective 2 and/or of the detection objective 3 (U.S. Pat. No. 3,305,294 A). The Alvarez plates 12 are embodied in such a way that they correct aberrations that may occur, precisely in the case of a set angle between the specimen holder 7, e.g., a cover slip, and the optical axes A1, A2 of the respective objective 2, 3. Unwanted aberrations that lead to a lower imaging quality already occur in the case of a small deviation of the angle (e.g., <0.1°). Therefore, the cover slip, for example, must be aligned before the start of an experiment so that the angle deviation lies within the admissible tolerances. Moreover, it is helpful if the distance between the objective 2, 3, or a possibly present additional lens (e.g., a meniscus lens), and the cover slip is also adjustable in addition to the angle such that the specimen 5, or the region thereof to be imaged, lies in the image plane BE of the detection objective 3.

A possibility for correcting aberrations of a microscope caused by a cover slip are known from the publication by McGorty et al. (2015: Open-top selective plane illumination microscope for conventionally mounted specimens; OPTICS EXPRESS 23: 16142-16153). The inverted SPIM microscope has a water prism, by the effect of which aberrations occurring as a consequence of the oblique passage of the detection light through the cover slip are partly compensated.

A possible method for positioning a specimen holder in a beam path of a microscope is described in DE 10 2016 212 019, which has not been published to date. In the methods disclosed therein, reflected components of an illumination radiation are used to capture current actual positions and actual relative positions of the specimen holder.

In addition to the manner of positioning of the specimen holder, aberrations may also be caused by deviations of the actual thickness of the specimen holder from a nominal thickness. Commercially available cover slips, and also the bases of the Petri dishes, multiwell plates and similar specimen holders (subsumed below as specimen holders) have an allowable variance of the glass or material thickness around the nominal thickness. Thus, for example, the thickness range in the case of cover slips with the thickness #1.5 is specified as 160-190 µm, while the thickness #1 is specified as 130-160 µm. Thus, for example, if the correction element was designed for or set to a nominal thickness of 175 µm, a cover slip or base, for example a glass base, with a thickness of 160 µm leads to significant aberrations, in particular at high numerical apertures, within the scope of the oblique passage of illumination radiation, for example, through the specimen holder, which is required for the inverted configuration.

The problem here is that the thickness of the cover slip or the base of the specimen holder is not known a priori and therefore technical solutions are required to establish and set the current thickness and, optionally, the required correction parameters for the adaptive correction element.

SUMMARY OF THE INVENTION

The invention is based on the object of proposing a method for determining the thickness of a specimen holder in the beam path of a microscope.

The object is achieved by the subject matter of the independent claim 1. Advantageous configurations are specified in the dependent and alternative independent claims.

The method for determining the thickness of a specimen holder in the beam path of a microscope, said specimen holder being transparent to illumination radiation and embodied to receive a specimen, comprises the steps set forth below.

A step A relates to arranging the specimen holder, which has a first interface and a second interface, in a specimen plane. The specimen plane is situated in an XY plane spanned by an X-axis and a Y-axis of a Cartesian coordinate system.

In step B, the first interface and the second interface are aligned or adjusted parallel to the specimen plane.

In a step C, at least one beam of the illumination radiation is directed along a first optical axis (illumination axis) onto the adjusted specimen holder at an illumination angle.

Step D relates to capturing at least two measurement values of a reflected component of the illumination radiation or at least two measurement values of a detection radiation caused by the illumination radiation.

Subsequently, one spacing of the first and second side face in the direction of the Z-axis in relation to one another is established as a thickness in step E, depending on at least two captured measurement values.

The terms specimen holder, base of the specimen holder and cover slip are used synonymously in this description unless a different meaning is expressly specified.

A detection radiation should be understood to mean illumination radiation reflected at the specimen and/or radiation caused by the illumination radiation in the specimen, in particular excited fluorescence radiation. By way of example, the first and second interfaces are side faces of the specimen holder and are also referred to as first side face and second side face below.

In the method according to the invention, use is made of measurement signals, the values of which are significantly influenced by the thickness of the specimen holder. The established information in relation to the thickness of the specimen holder can advantageously be used to undertake required corrections in the beam path and, for example, to reduce aberrations. Thus, optically effective correction elements that are arranged in the beam path of the illumination radiation, in a beam path of the reflected component and/or in a beam path of the detection radiation can be actuated depending on the established thickness and the relative positions and optical corrective effects thereof are set in the respective beam path.

Alvarez plates, which are displaceable in relation to one another in controlled fashion (also referred to as Alvarez manipulators), are examples of correction elements, and so the optical effect of Alvarez plates correctly set in relation to one another can reduce or even compensate aberrations of the specific combinations of objectives, wavelengths of the illumination radiation, detection radiation and/or specimen holder. In addition or as an alternative thereto, mirrors that are deformable in controlled fashion (deformable mirrors), actuatable mirror or micromirror arrays (digital mirror devices) and/or light modulators (spatial light modulators, SLMs) can be used as correction elements.

An optical arrangement, in particular an inverted light sheet arrangement, which is used to carry out a method according to the invention in one of its configurations, for example optionally has a correction element in the beam path of the illumination radiation. This correction element, which may also consist of the plurality of partial elements, for example of two Alvarez plates, can be designed for static correction of aberrations. In the beam path of the detection radiation, a correction element is designed to be modifiable in controlled fashion in respect of its optical effects, and so occurring aberrations can be influenced, in particular reduced, by means of an appropriate actuation of the correction element. The correction elements in the various beam paths can be equivalent or even identical. Correction elements that are actuatable and the combined optical effect of which leads to reduction of aberrations may also be present in the beam paths of illumination radiation and detection radiation.

In further configurations of the method, the illumination radiation in the form of a light sheet is directed onto the specimen holder and a light sheet is produced in the specimen plane. If a specimen to be examined is present in the specimen plane, the former is illuminated by the light sheet and it is possible to capture corresponding images of the illuminated regions of the specimen.

Thus, it is possible to use different illumination radiations in order, for example, to carry out different partial steps of the method according to the invention. A light sheet can be produced as a static or dynamic light sheet, as is known to a person skilled in the art from the prior art.

The illumination radiation is provided and directed onto the specimen holder as at least one beam of individual rays (beam). A so-called Gaussian beam is a typical form of the illumination radiation.

In further configurations of the method according to the invention, a radiation with self-reconstructing beams or non-diffractive beams can be used as illumination radiation and it can be embodied, for example, in the form of a Bessel beam, Mathieu beam, $sinc^3$ beam, a lattice light sheet, a coherent Bessel beam, a sectioned Bessel beam or an Airy beam and can be directed onto the specimen beam.

A Mathieu beam can be considered to be a propagation-invariant optical field according to the Helmholtz equation with elliptic coordinates (Gutierrez-Vega, J. C. et al, 2001: Experimental demonstration of optical Mathieu beams; Optics Communications 195: 35-40).

Beam forms deviating from a Gaussian beam, e.g., the $sinc^3$ beam, have intrinsic structuring that is particularly suitable for analyzing the image quality measures of sharpness and/or contrast, as is described further down.

Particularly in regions of the specimen that exhibit a largely homogeneous fluorescence emission, a light sheet that is structured by the effect of the structured beam forms can itself be used as a test lattice. By way of example, the contrast can be maximized on the basis of such a lattice. To this end, the specimen is illuminated with the structured light sheet, wherein the different intensities of the structured illumination radiation that are applied to the specimen accordingly lead, or may lead, to a structured fluorescence excitation in the specimen. Signals of the fluorescence radiation that is excited in structured fashion are captured as detection radiation by means of a suitable detector and maximum signal intensities are established and stored as $I_{max}$ and minimum signal intensities are established and stored as $I_{min}$. A modulation depth of the lattice structure can be analyzed by the relationship $I_{max}-I_{min}/I_{max}+I_{min}$. However, it is likewise possible to apply the image quality criteria, described below, to this test structure.

The thickness of the specimen holder is established indirectly on the basis of at least two measurement values. One option consists in evaluating reflected components of the illumination radiation (reflections).

Components of the illumination radiation are usually reflected at the interfaces, for example the upper and lower sides of specimen holders. Reflections at these interfaces are implemented with a reflectivity that depends on the difference in the refractive index between the media (glass-immersion, glass-specimen) and on the angle of incidence, for example totaling approximately 3% in each case. Here, the reflected component of the illumination radiation usually lies virtually completely within the detection NA (numerical aperture of the detection objective). A consequence of this is that the reflected component can be largely imaged on a detector that is optically connected to the detection objective. This reflected component can now be used to establish the thickness of the specimen holder, for example of the base thereof, which is transparent to the illumination radiation and the reflected component. In order to detect this reflected component, an emission filter for fluorescence microscopy that is situated in the beam path may be removed where necessary.

To this end, at least one beam of the illumination radiation can be steered along a first optical axis (illumination axis) onto the aligned specimen holder at an illumination angle in step C in an advantageous configuration of the method according to the invention, the illumination angle between the first optical axis and a reference axis that is perpendicular to the XY-plane being unequal to zero. Thus, the illumination angle is directed obliquely at the specimen holder, for example at an illumination angle of 45° or 60°. In step D, a reflected component of the illumination radiation, which is reflected from the first side face or from the second side face of the specimen holder is captured in an intended relative position as a first measurement value by means of a detector. Subsequently, the specimen holder is displaced in the direction of a Z-axis, directed perpendicular to the XY-plane, until a reflected component of the respective other side face is captured in the intended relative position as a second measurement value by means of the detector. The displacement path in the direction of the Z-axis should be understood to be a change in the relative position between a specimen holder and an illumination objective and/or a detection objective, for example. Consequently, the displacement path can also be realized by a movement of illumination objective, detection objective and/or detector and also by a combined movement of specimen holder, illumination objective, detection objective and/or detector.

An intended relative position is reached when the specimen holder assumes an expected or desired manner of positioning. It is possible to set an admissible tolerance of the intended relative position.

In step E, a displacement path in the direction of the Z-axis is established on the basis of the first and second measurement value, said displacement path having been necessary to capture the reflected components of the first and second side faces in the intended relative position. The thickness is established on the basis of the first and second measurement values. If the material of the specimen holder has a different refractive index to a medium situated between the illumination objective, for example, and the specimen holder, the displacement path does not correspond to the thickness of the specimen holder.

In order to establish the thickness of the specimen holder if the displacement path is known, it is possible to capture the illumination angle and an angle of the illumination radiation that has been refracted by the material of the specimen holder. It is possible to calculate the thickness of the specimen holder if angle functions (trigonometry) are applied and if the displacement path is taken into account.

In a further configuration of the method, an image quality measure is defined, the latter being used as a criterion for setting at least one of the correction elements. A current actual manner of positioning of at least one of the correction elements is modified step-by-step or continuously in the process. Measurement values of the image quality measure are assigned to each of the selected actual manners of positioning of at least one of the correction elements and stored, said measurement values having been captured in the case of the relevant actual manners of positioning. A current value of the image quality measure is established in each case on the basis of the measurement values of the image quality measure. If these current values of the image quality measure are available for an evaluation, an actual manner of positioning of the at least one correction element is selected, a desired image quality measure, i.e., desired value of the image quality measure, being obtained in the case of said actual manner of positioning. The selected actual manner of positioning can be set as future intended manner of positioning.

Preferably, a table or mathematical relationship (function) has been established as a reference and has been stored in a repeatedly callable fashion. This reference allows an assignment of values of the image quality measure to a respective thickness of the specimen holder.

For the purposes of carrying out the method, measurement values of at least one of the image quality measures of contrast, a sharpness measure, signal-to-noise ratio, signal intensity and parameters of a point spread function or combinations thereof can be used.

The thickness of each specimen holder has to be corrected individually, and so the use of a test specimen such as, e.g., a grating, a USAF chart or the like is not applicable here. However, in further configurations of the method according to the invention, it is possible to use a specimen containing separated punctiform fluorescence sources. At least two measurement values of the image quality measure are captured on the basis of the detection radiation of at least one number of punctiform fluorescence sources and used to establish the thickness of the specimen holder. Separated punctiform fluorescence sources do not overlap. By way of example, it is possible to introduce separated fluorescing nanospheres (so-called "beads") into the specimen in order to undertake a specimen-independent image quality analysis using only the very bright nanospheres. If nanospheres are contained in the specimen, knowledge that these are approximately point object also allows the point spread function (PSF) of the imaging optical unit to be analyzed, for example in order to minimize the FWHM (full width at half maximum) of the point spread function.

The contrast can be used as an image quality measure. The contrast of an individual, isolated object against the uniform background is defined by way of $$C = \frac{\Delta S}{S},$$

where ΔS is the increase or decrease of the signal in relation to the (uniform) background signal S. However, this definition is not suitable for the automated determination of a local image contrast of any sample that is not known a priori.

Contrast definitions which calculate the contrast at each pixel of the image or of the ROI (region of interest) are better suited therefor. Additionally, only certain spatial frequency ranges are considered in the Fourier-transformed image, as a result of which signal, background and noise can be isolated better (Peli, Eli. (1990), "Contrast in complex images." Journal of the Optical Society of America A, 7: 2032-2040).

The contrast in each pixel and each frequency band k thus emerges as $$c_k(x, y) = \frac{B_k(x, y)}{\sum_{i=0}^{k-1} B_i},$$

where $B_k$ (x, y) is the band-pass-filtered image of the frequency band k and $\Sigma_{i=0}^{k-1}B_i$ contains the energy below this frequency band. The boundaries can be suitably set on the basis of typical microscopy images in Fourier space such that then, for example, a metric is available by way of the mean value of the $c_k$ (x, y) within the image or the ROI, said metric being able to be maximized by adjusting the adaptive correction element 2.

In a further possible configuration of the method, the sharpness measure is established on the basis of an analysis of the spatial frequency space of a captured image by virtue of spatial frequency components of the captured image being subdivided into two groups, for example, by means of a threshold and a maximum or minimum of the spatial frequency components contained in the respective groups being used as a sharpness measure (e.g., De, Kanjar, and V. Masilamani. "Image sharpness measure for blurred images in frequency domain." Procedia Engineering 64 (2013): 149-158).

Further, in a further configuration of the method, it is possible to establish the sharpness measure on the basis of an analysis of the fourth central moment of the spatial frequency spectrum (kurtosis, fourth order central moment) of a captured image by virtue of low or minimal values of the kurtosis being selected (e.g., in Zhang, Nien Fan, et al. "Image sharpness measurement in the scanning electron microscope—Part III." Scanning 21.4 (1999): 246-252).

In order to achieve a high compensation of occurring aberrations, images of the specimen to be measured are advantageously used for the iterative analysis of the corresponding image quality measures and subsequent adaptation of the adaptive correction element or correction elements.

It is possible, by all means, that the parameter space to be checked iteratively is too large or that the system cannot be iteratively optimized toward the global minimum—for example, an optimal inclination of the specimen holder 7 and an optimal focus position—and remains in a local minimum instead. Therefore, it is advantageous if the method of image quality evaluation is carried out in combination with one of the aforementioned configurations of the method. Here, the inclination of the specimen holder 7 and the actual position in the direction of the Z-axis Z are initially set approximately, for example by means of one of the above-described methods. Subsequently, a fine adjustment is carried out by means of an image quality evaluation. This method is not suitable for conventional microscope systems.

A further advantage arises in addition to the restriction of the possible parameter space that is to be tested iteratively: if the cover slip thickness is determined and compensated by the light sheet reflection, the adaptive element may optionally be able, by way of the iterative maximization of the image quality, to also compensate further aberrations induced by the specimen.

The method according to the invention can be part of a method for capturing image data. Here, image data of a specimen arranged in the specimen plane of the microscope can be received by virtue of detection radiation being caused in the specimen by means of illumination radiation and being captured. Such a method comprises steps A to E, listed above, for determining the thickness of the specimen holder.

A microscope that is embodied as an inverted microscope is used in an advantageous configuration of the method. The inverted microscope comprises an illumination objective with a first optical axis, wherein the first optical axis penetrates a specimen plane that is spanned by an X-axis and a Y-axis that is orthogonal to the X-axis. Furthermore, a detection objective with a second optical axis, embodied to detect light coming from the specimen plane, is present, wherein the illumination objective and the detection objective are aligned in such a way in relation to one another and in relation to the specimen plane that the first optical axis and the second optical axis intersect in the specimen plane and include a substantially right angle therebetween. The first optical axis and the second optical axis each include an angle that differs from zero with a third axis that is directed orthogonally to the specimen plane in the direction of a Z-axis and that serves as a reference axis. The configuration specified above is particularly suitable for light sheet microscopy.

The method according to the invention is described below in an exemplary manner. Below, the actual relative position and intended relative position refer to the relative positions of the image of the reflected component on the detector, in particular on a detection surface of the detector.

In steps A and B, the specimen holder is arranged and aligned in the specimen plane. The alignment may be carried out manually or in automated fashion. An already reflective component of the illumination radiation and/or auxiliary radiation, for example radiation only used for the alignment process, can be used for alignment purposes, and consequently step C can be incorporated in the process of aligning the specimen holder. To this end, e.g., a specimen holder, which has a base with a first side face and a second side face that is transparent to the illumination radiation, is displaced in the direction of the Z-axis until the component of the illumination radiation reflected by the first side face, e.g., the upper side, of the base is captured by means of the detector. The relative position between specimen holder and detector is preferably set in relation to one another in such a way that an actual relative position of the captured component approximates an intended relative position on the detector. The intended relative position advantageously is centrally on the detector surface in order to largely avoid an actual relative position of the reflected component being outside of the detector surface when adjusting the intended relative position.

By way of example, the base can be the base of a dish, for example made of glass or plastic. It is also possible that a cover slip with its first and second side face is a base within the aforementioned sense. A sufficient transparency of the material of the base to the illumination radiation or the illumination radiations, and the first side face and second side face, which act as interfaces here, at which refractions and/or reflections of the illumination radiation can be implemented, are of importance here.

The presence of a tilt of the first side face of the base about the X-axis can be checked by virtue of establishing an angle deviation of the actual relative position from the intended relative position. If an angle deviation that is greater than an admissible angle deviation is determined here, the specimen holder is rotated about the X-axis until the angle deviation is minimized. Optionally, it is possible to establish a preferred rotational direction for compensating the tilt in order, for example, to compensate the angle deviation by way of the shortest rotational path. Subsequently, an occurrence of a deviation of the intended position from the actual position in the direction of the Z-axis is checked. If an inadmissible deviation occurs, the aforementioned is or are optionally repeated. After these processes have been completed, the specimen holder is aligned parallel to the X-axis.

Optionally, an alignment of the first side face in the direction of the Y-axis is checked in a further alignment process by virtue of the specimen holder being displaced in the direction of the Y-axis and a deviation from the direction of the Y-axis being determined by a migration of the captured reflected component on the detector. If migration, i.e., of the actual relative position, of the captured reflected component occurs, the specimen holder is rotated about the X-axis until no more migration occurs or until the latter lies within an admissible tolerance limit.

In step D of the method, the adjusted specimen holder is displaced from a first (intended) manner of positioning, in which a component reflected by the first side face is captured in a first intended relative position, in the direction of the Z-axis until the image of the captured reflected component reaches a second intended relative position, in which a component that is reflected from the second side face, for example the lower side, of the base is captured. An actual spacing between the first and second side face from one another in the direction of the Z-axis is established depending on the displacement path in the direction of the Z-axis traveled between the first intended relative position and the second intended relative position. The spacing established thus corresponds to the thickness of the base.

The distance or the thickness of the base can be calculated. A calculation option is specified below in the context of the exemplary embodiments.

The reflected component is captured by means of a detector, for example by means of a camera, for example comprising a CCD or CMOS chip, or by means of a four-quadrant diode.

Advantageously, the method according to the invention is also applicable to microscopes with a perpendicular alignment of a beam path or of the beam paths. Although the aberrations in such a conventional arrangement are smaller, these aberrations are, however, of great importance to the imaging quality of modern objectives with large numerical apertures, in particular for water-immersion objectives or TIRF (total internal reflection fluorescence microscopy) objectives.

BRIEF DESCRIPTION OF THE FIGURES

The invention is explained in more detail below on the basis of exemplary embodiments and figures. In the figures:

FIG. 1a is a schematic illustration of a microscope with a 45° arrangement of the illumination objective and detection objective above a specimen plane and with a wide-field objective below a specimen plane, in accordance with the prior art;

FIG. 1b is a schematic illustration of a microscope with an inverted 45° arrangement of the illumination objective and detection objective below a specimen plane and with a wide-field objective above a specimen plane, in accordance with the prior art;

DETAILED DESCRIPTION OF THE EMBODIMENTS

Figure 2:
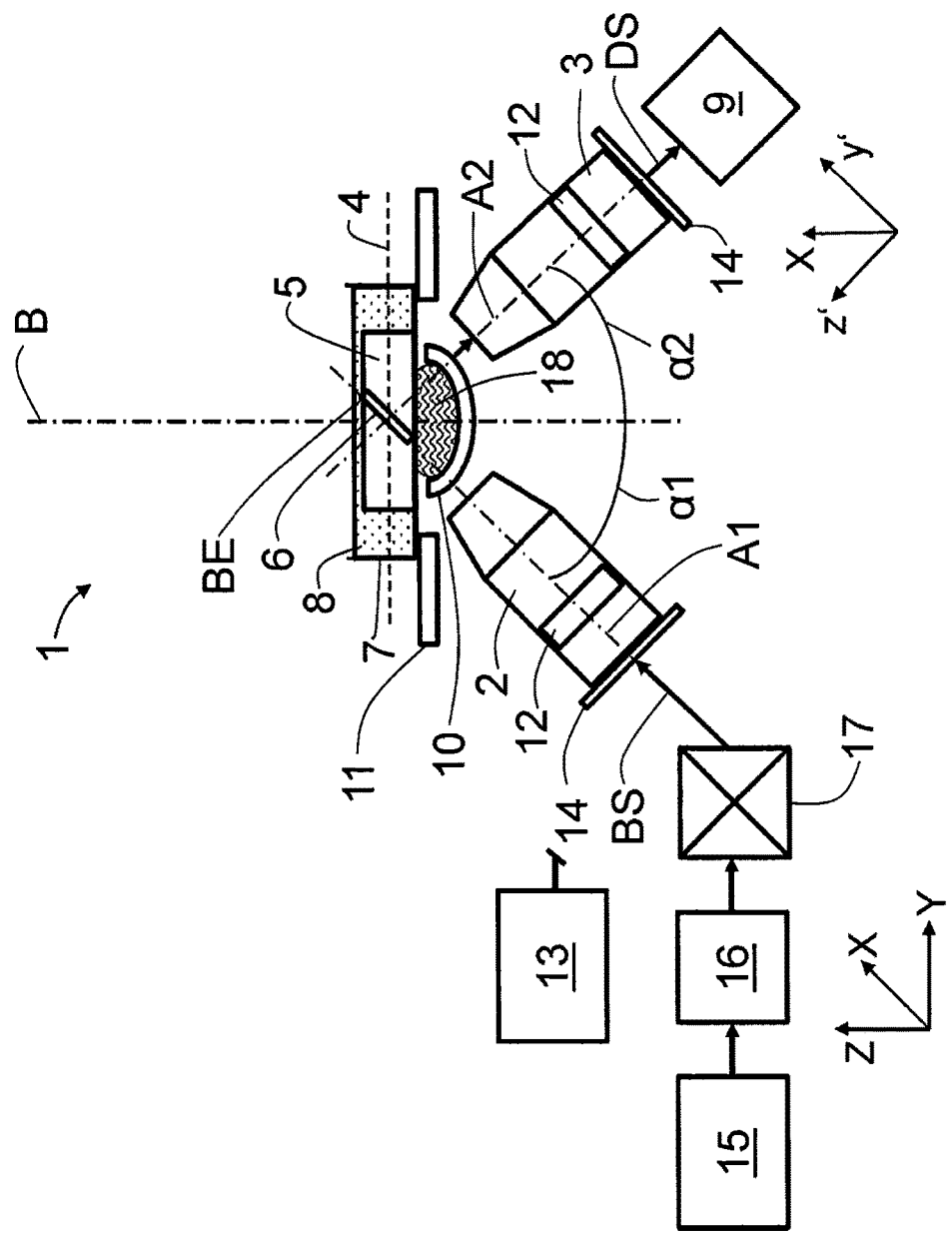
FIG. 2 is a schematic illustration of one exemplary embodiment of a microscope embodied for light sheet microscopy, having Alvarez plates and a meniscus lens.

In the following schematic illustrations of examples from the prior art and exemplary embodiments of the invention, the same reference signs denote the same technical elements.

An upright microscope 1, as depicted schematically in FIG. 1a, comprising an illumination objective 2, a detection objective 3 and, optionally, a wide-field objective 20 is known from the prior art. A light sheet 6 is produced or producible along a first optical axis A1 by means of the illumination objective 2, said light sheet being usable to examine a specimen 5 arranged in a specimen plane 4. The detection objective 3 has a second optical axis A2, along which the light coming from the specimen plane 4 may be captured. The first optical axis A1 and the second optical axis A2 are aligned orthogonal to one another and each include an angle of 45° with the specimen plane 4 which serves as a reference plane.

The wide-field objective 20 has a third optical axis A3, which is directed orthogonally to the specimen plane 4 and serves as a reference axis B. The first to third optical axes A1 to A3 intersect in the region of extent of the light sheet 6 in the specimen 5. Moreover, the first optical axis A1 includes a first angle α1 with the reference axis B and the second optical axis A2 includes a second angle α2 of 90°−α1 with the reference axis B, e.g. respectively 45°.

The specimen 5 is held in a specimen holder 7 which is situated on a specimen stage 11 and filled with a liquid 8.

FIG. 1b schematically shows a microscope 1 with an inverted arrangement of illumination objective 2 and detection objective 3, in which the illumination objective 2 and the detection objective 3 are arranged below the specimen plane 20 and the wide-field objective 20 is arranged above the specimen plane 20. Once again, the angles α1 and α2 are 45° in each case.

The following exemplary embodiments are illustrated in an exemplary manner on the basis of inverted microscopes 1 and, in further embodiments, may also be embodied as upright microscopes 1.

An exemplary embodiment of an inverted microscope 1, embodied for light sheet microscopy and comprising correction elements 12 in the form of Alvarez plates and a meniscus lens 10, is illustrated in FIG. 2. The angles α1 and α2 are 45° in each case. The correction elements 12 serve to correct aberrations which, in essence, may occur on account of the oblique passage of the illumination radiation BS through the base of the specimen holder 7. The optional meniscus lens 10 assists the transition of the illumination radiation BS from air into an immersion medium 18 and into the liquid 8 and, for a detection radiation DS, the transition from the liquid 8 into the immersion medium 18 and into the air.

The specimen holder 7 is held on the specimen stage 11. The specimen stage 11 itself is adjustable in a controlled fashion in an XY-plane, spanned by the X-axis X and the Y-axis Y, by means of drives that are not illustrated in any more detail.

The illumination objective 2 and the detection objective 3 are each adjustable in a controlled fashion along the first optical axis A1 and along the second optical axis A2, respectively, by means of an objective drive 14, which is embodied as a piezo-drive in this case.

The illumination radiation BS is provided by a laser module 15 and shaped by means of a beam-shaping unit 16. The beam shaping 16 is, e.g., an optical unit, by means of which the provided illumination radiation BS is collimated, for example.

A scanner 17 is present downstream of the beam-shaping unit 16, the shaped illumination radiation BS being deflectable in a controlled fashion in two directions by means of said scanner (XY scanner).

Downstream of the scanner 17, the illumination objective 2 is arranged on the first optical axis A1. The illumination radiation BS that is deflected by the scanner 17 reaches the illumination objective 2 and it is shaped and/or focused by the latter.

The detection radiation DS is directed onto a detector 9 along the second optical axis A2 and able to be captured by said detector.

A control unit 13 is present for the purposes of actuating the specimen stage 11, the piezo-drives 14, the correction elements 12, the laser module 15, the beam shaping 16, the scanner 17 and/or the detector 9, said control unit being linked to the elements to be actuated in a connection suitable for data transmission.

In further embodiments, the control unit 13 is additionally configured to capture, store and/or evaluate measurement values. Further elements and units of the microscope 1 may be actuatable by means of the control unit 13 and/or measurement values can be obtained and evaluated thereby.

For description purposes, two coordinate systems with mutually orthogonal axes are used below. The first coordinate system is the coordinate system of the entire arrangement with an X-axis X, a Y-axis Y and a Z-axis Z. Ideally, the specimen holder 7, in particular the base thereof, is aligned parallel to an XY-plane that is spanned by the X-axis X and the Y-axis Y. The second coordinate system is the coordinate system of the detector 9 with the X-axis X, a y-axis y' and a z-axis z'. Imaging of, for example, an image from the image plane BE onto a detector surface 9.1 (see FIG. 4) of the detector 9 has the coordinates X and y'. The X-axis X is identical in both coordinate systems and directed in orthogonal fashion to the plane of the drawing of the figures. The two other axes Y and y' and Z and z', respectively, can be superposed on one another by way of a rotation about the X-axis X.

Figure 3:
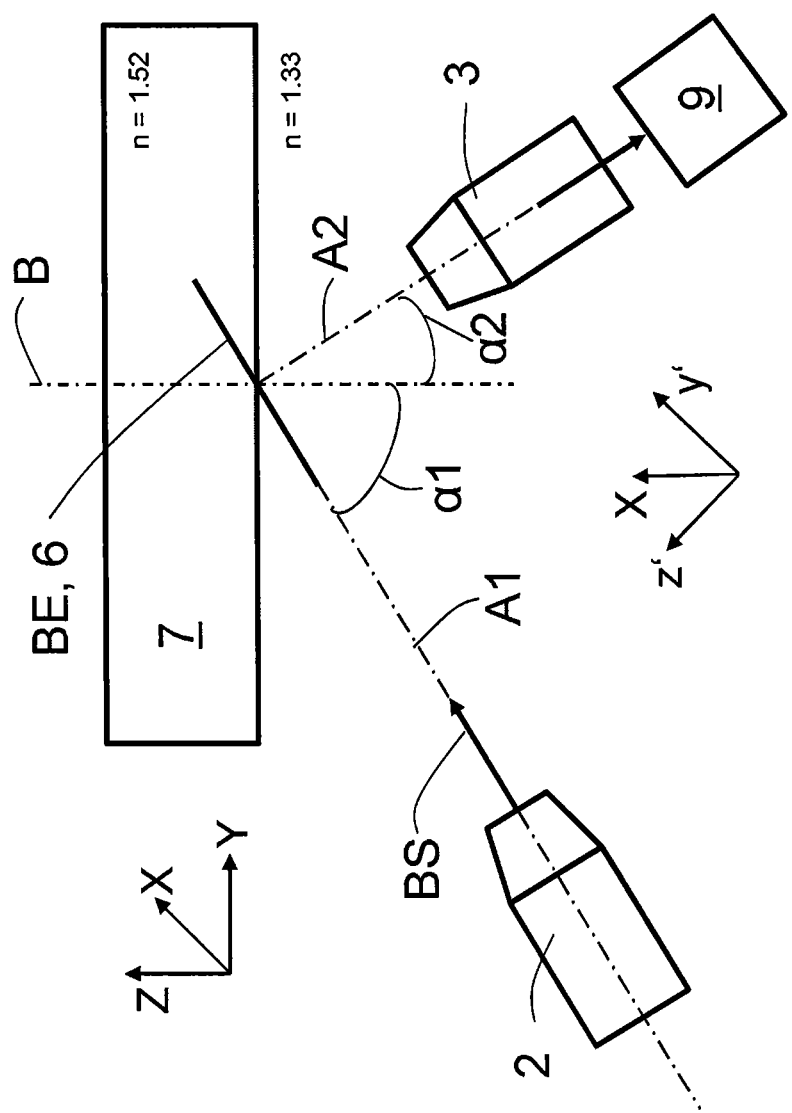
FIG. 3 is a schematic illustration of one exemplary embodiment of an inverted light sheet microscope.

The following exemplary embodiments are based, in exemplary fashion, on an inverted light sheet microscope, in which the first optical axis A1 of the illumination objective 2 includes an angle α1 of 60° in relation to the reference axis B and the second optical axis A2 of the detection objective 3 includes an angle α2 of 30° (FIG. 3). For improved clarity, an optional meniscus lens 10 has not been illustrated in all the drawings. Moreover, a refractive index of n=1.52 is assumed in exemplary fashion for the specimen holder 7, for example in the form of a cover slip or the base of the specimen holder 7, and a refractive index n=1.33 is assumed in exemplary fashion for water as an immersion medium 18 (see FIG. 2). A light sheet b is produced or producible in the image plane BE.

Figure 4:
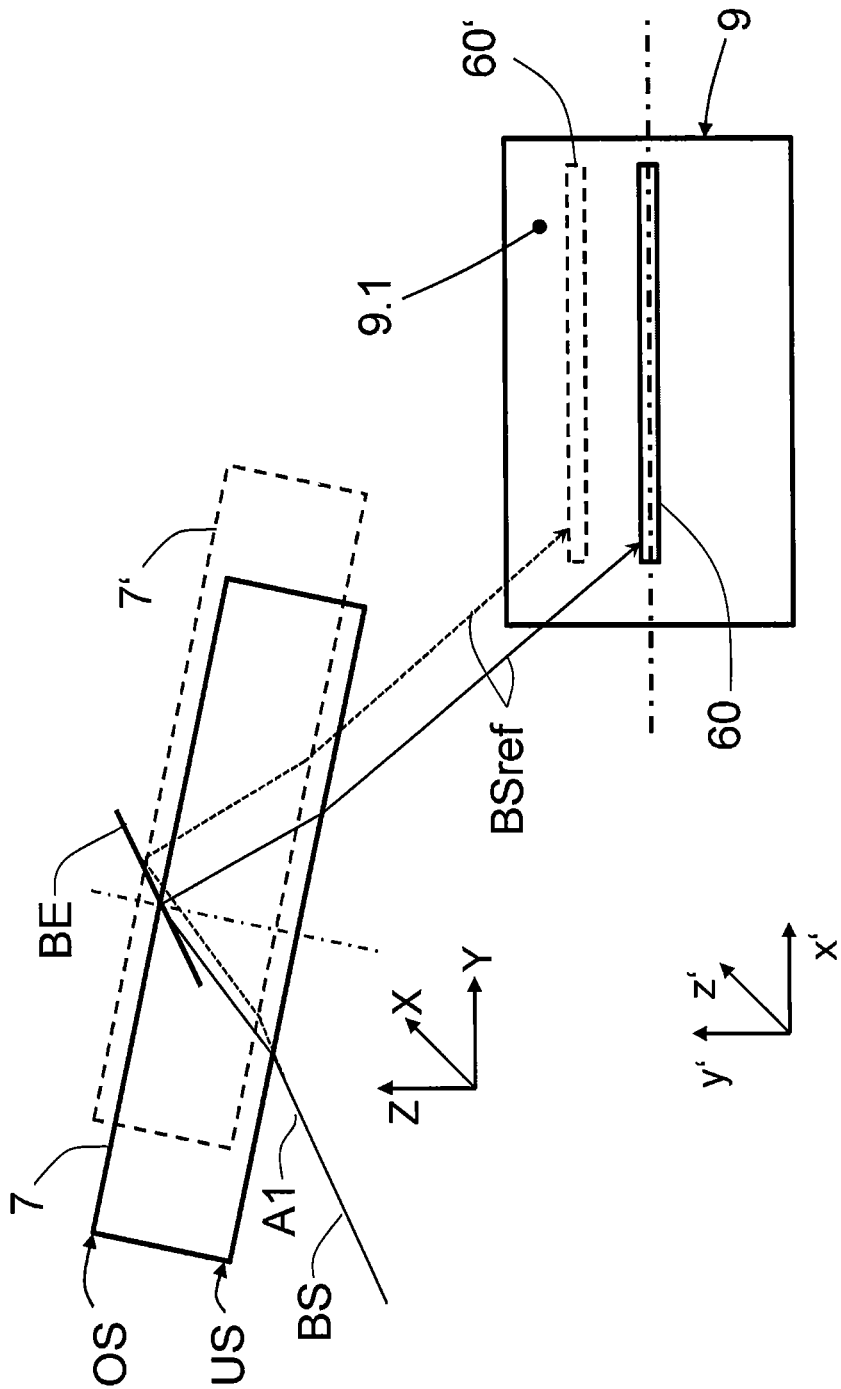
FIG. 4 is a schematic illustration of intended relative positions and actual relative positions of reflected components of the illumination radiation on the detector surface.

In FIG. 4, the detector surface 9.1 is illustrated in a plan view, while the specimen holder 7 and the light sheet 6 are illustrated in a lateral view. The illustrated orientation of the coordinate system of the detector 9 with the axes X, y' and z' emerges from these views that are rotated in relation to one another.

In order to adjust the specimen holder 7, the specimen holder 7 is displaced in the direction of the Z-axis Z in step 1, until the component of the illumination radiation BSref that is reflected from the first side face OS, from the upper side in the illustrated exemplary embodiment, is captured. Here, the assumption is made that the image plane BE is fixed. A relative position of the specimen holder 7 and the detector 9 in relation to one another is changed in such a way that an actual relative position of the component of the illumination radiation BSref, captured as an image 60, approximates an intended relative position of the image 60 on the detector surface 9.1 of the detector 9 (FIG. 4).

The actual position of the specimen holder 7 in the direction of the Z-axis Z is optimally adjusted when the image 60 of the cross section of the light sheet 6 lies centrally on the detector surface 9.1.

Since there is a reflection BSref from both the first side face OS and the second side face US of the cover slip, it is necessary to be able to distinguish between these. If the specimen holder 7 is moved in a positive direction (upward in FIG. 4) along the Z-axis Z, it is possible to initially position the reflection BSref at the first side face OS centrally on the detector surface 9.1. The reflection BSref caused by the second side face US can only be adjusted centrally in the case of a further displacement in the positive direction along the Z-axis Z.

If the cross section of the light sheet 7 is adjusted centrally, the image 60 is imaged in an intended relative position centrally on the detector surface 9.1, as illustrated schematically in FIG. 4.

The above-described adjustment of the specimen holder 7 can be complemented by determining the thickness d, for example of the base of the specimen holder 7. Below, for the sake of simplification, reference is made to the thickness d of the base of a specimen holder 7 or to the thickness d of a cover slip used as a specimen holder 7.

Figure 5:
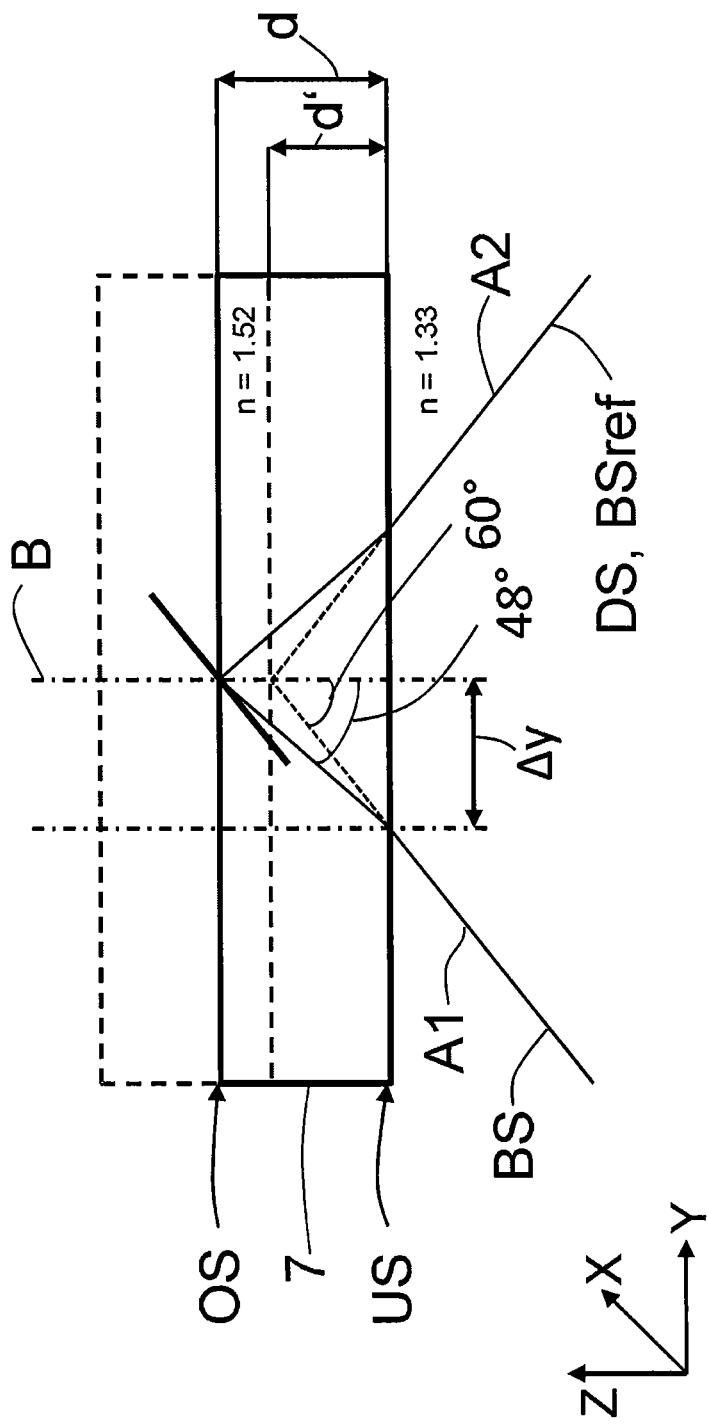
FIG. 5 is a schematic illustration of the principle of determining the thickness of the specimen holder.

An exemplary beam path of the illumination radiation BS and of the detection radiation DS or of a reflected component BSref of the illumination radiation BS is illustrated in FIG. 5. The illumination radiation BS is directed onto the lower side US of the specimen holder 7 along the first optical axis A1 at an angle of 60° to the perpendicular. When the illumination radiation BS passes through the interface, formed by the lower side US, between air with a refractive index n=1.33 and the material of the specimen holder 7 with a refractive index n=1.52, the illumination radiation BS is refracted toward the perpendicular and it runs at an angle of 48° to the upper side OS of the specimen holder 7.

The component of the illumination radiation BSref is reflected back to the second side face US at the first side face OS in an image plane BE. When the reflected component of the illumination radiation BSref passes through the second side face US, it is refracted away from the perpendicular again and it reaches, for example, the detector 9 (not shown; see FIG. 4) along the second optical axis A2 as detection radiation DS.

Aberrations that occur in the case of an oblique passage of the illumination radiation BS through the specimen holder 7 are substantially dependent on the thickness d of the latter, i.e., on the distance between first and second side face OS, US. For this reason, the correction elements 12 (FIG. 2), for example, are displaceably mounted in the illumination objective 2 and/or the detection objective 3, in order to match an aberration correction to the thickness d by displacing the correction elements 12 in relation to one another.

The thickness d of the specimen holder 7 can be determined on the basis of the reflections BSref from the first and second side face OS, US. The two reflections BSref are illustrated schematically in FIG. 5, with d being the thickness and d' being a displacement path of the specimen holder 7 in the positive direction along the Z-axis Z.

The thickness d is determined as follows:

First, the specimen holder 7 is set in such a way that the reflection BSref from the first side face OS lies in the intended relative position, for example centrally, on the detector surface 9.1 as image 60 (see FIG. 4) and the specimen holder 7 has no inclination. In the example, the angle between the illumination radiation BS and reference axis B is 60° outside of the specimen holder but 48° within the specimen holder 7 on account of the occurring refraction. The reference axis B extends through the image plane BE (see FIG. 3) and through the point of incidence, illustrated in a simplified fashion, of the illumination radiation BS on the first side face OS. In the direction of the Y-axis Y, $\Delta y$ denotes a path between the passage point of the illumination radiation BS through the second side face US and a point of incidence on the first side face OS.

Then, the specimen holder 7 is displaced in the positive direction along the Z-axis Z until the reflection BSref from the second side face US lies in the intended relative position on the detector surface 9.1 as an image 60 (see FIG. 4). The displacement path d' required to this end is established, for example measured or calculated. The angle between the non-refracted illumination radiation BS and the reference axis B now is 60° in the example.

The thickness d of the specimen holder 7 can now be calculated by means of the following trigonometric relationships and the angles specified in the example:

$\tan(60°) = \Delta y/d'$ $\tan(48°) = \Delta y/d$ where $\Delta y$ denotes the path between the passage of the illumination radiation BS and the reference axis B, measured in the direction of the X-axis X.

The thickness d is calculated from $d'*\tan(60°)/\tan(48°)$.

In further configurations of the method, there can be an additional correction of the inclination by virtue of a light sheet 6 being produced with a wavelength that is not used for imaging, for example in the range of infrared light. This light sheet 6 can be used to check the actual position of the specimen holder 7, in particular the actual position thereof in the direction of the Z-axis Z, on a permanent basis or at certain times, for example during an experiment, and optionally to correct said actual position during the experiment. It is also possible to use a beam, for example a Gaussian beam, a Bessel beam or a Mathieu beam, instead of a light sheet 6. A four-quadrant diode can be used as a detector 9.

In further possible configurations, an autocollimation telescope can be directed onto the specimen holder 7. An oblique position of the specimen holder 7 is converted into displacement of the reflection BSref on the detector 9 of the autocollimation telescope. It is only possible to adjust the inclination angle using this approach.

A further possible configuration requires a collimated laser, which is directed onto the specimen holder 7. The laser is aligned parallel to the perpendicular, for example to the reference axis B. By way of example, the reflection BSref is mirrored-out by means of a beam splitter or a pole optical unit and it is registered on a four-quadrant diode. Now, the inclination of the specimen holder 7 can be set and corrected with the aid of the signal of the four-quadrant diode. It is not possible to set the actual position in the direction of the Z-axis Z using this configuration. The two aforementioned methods are suitable for conventional microscope systems and light sheet microscopes.

Further, it is possible to additionally undertake an evaluation according to an image quality measure in a further configuration of the method. Thus, the inclination and/or the focal position of the detection objective 3 can be adjusted iteratively in order to bring the measurement values of the chosen image quality measure to desired measurement values or in order to maximize said measurement values, for example. To this end, use can be made of the specimen 5 to be measured itself, or the beam profile of a beam of the chosen illumination radiation BS is analyzed.

In a further possible embodiment, the topography of the specimen 5 is determined by measuring the sharpness or another image quality criterion of the supported specimen 5 at least three points and by appropriately adjusting the distances of at least one of the objectives 2, 3 from the specimen 5, and the local cover slip inclination is calculated therefrom.

In further possible configurations, nanoparticles (so-called fiducials, beads) lying on the specimen holder 7 or markings applied to the specimen holder 7 can act as specimens 5.

Figure 6:
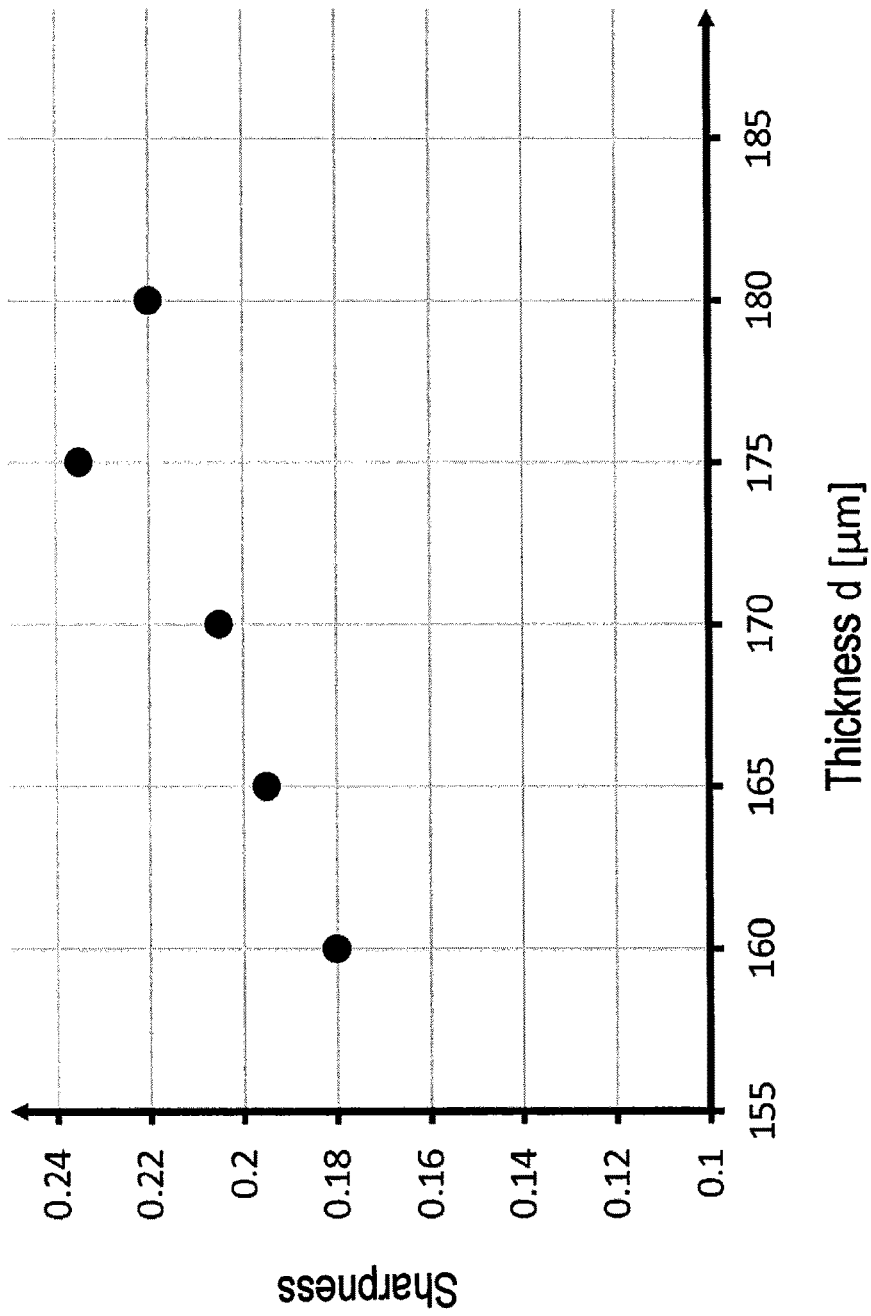
FIG. 6 is a schematic illustration of the sharpness measure as a function of a differently adjusted correction element in the case of an unknown thickness of the specimen holder.

FIG. 6 illustrates, in exemplary fashion, a relationship between the thickness d and the image quality measure of sharpness of a specimen holder 7 with a thickness d that is unknown a priori. The correction elements 12 or at least the correction element 12 present in the beam path of the detection radiation DS are/is incrementally set to a possible thickness d of the specimen holder 7. The increment is chosen as 5 μm, starting with a thickness d of 160 μm. A sharpness of an image captured by means of the detection radiation DS is established with each setting of the correction elements 12 or the correction element 12 selected in this way. In the graphic illustration of the measurement values, it is possible to identify that a maximum value of the sharpness image quality measure is reached in the case of a setting of the correction element 12 or of the correction elements 12 in which aberrations of the specimen holder 7 are compensated with a nominal thickness d of 175 μm. Therefore, an actual thickness d of 175 μm can be deduced.

Figure 7:
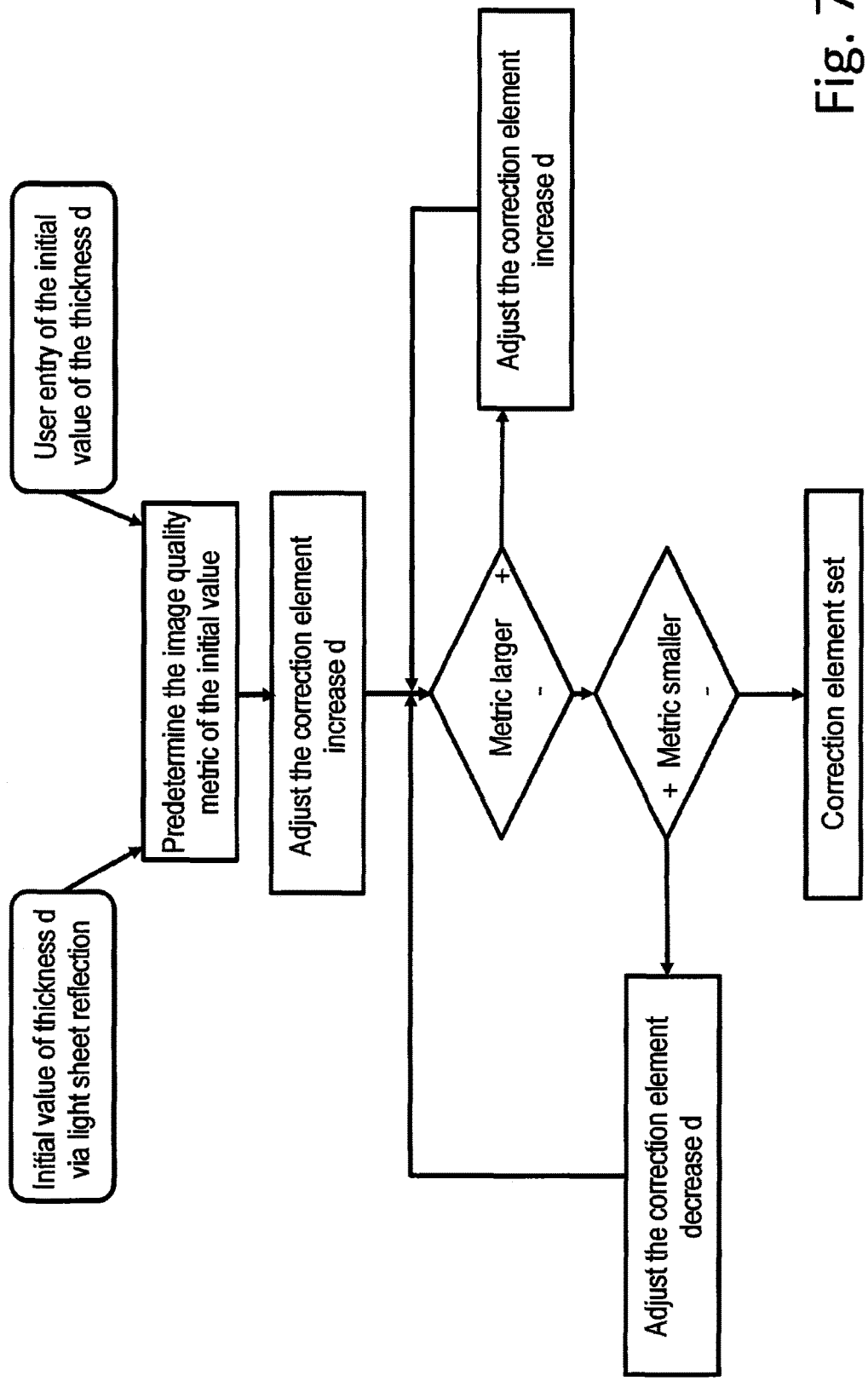
FIG. 7 is a flowchart of one configuration of the method according to the invention.

FIG. 7 illustrates a flow chart of a sequence of a configuration of the method according to the invention for determining the thickness d and of setting the at least one correction element 12 as a function of the thickness d.

Optionally, an initial value of the image quality measure (image quality metric) can be entered by the user or it can be predetermined, for example on the basis of determining a thickness using the reflected component BSref. The thickness d that was established or predetermined in this way serves as an initial value and as a first setting of the at least one correction element 12. Subsequently, the correction element 12 is brought into a setting corresponding to a greater thickness d. If the value of the image quality measure established with this setting increases, a setting is chosen which, in turn, corresponds to a greater thickness d. This loop can be repeated until the value of the image quality measure no longer increases or sinks again.

If the value of the image quality measure sinks after selecting a setting of the at least one correction element 12, a setting which is assigned to a reduced thickness d in relation to the preceding setting is chosen. Once a setting in which a value of the image quality measure is at a maximum has been found, the at least one correction element 12 is set and the control loop can be stopped. It is advantageous if a termination criterion is set, the meeting of which causes the control loop to be stopped. Thus, for example, it is possible to set a minimum difference in the values of the image quality measure, a termination being caused should this minimum difference be undershot.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Microscope
2 Illumination objective
3 Detection objective
4 Specimen plane
5 Specimen
6 Light sheet
60 Image (imaging/image of the light sheet cross section)
60' Image (of the light sheet cross section in the case of a displaced specimen holder 7')
B Reference axis
BS Illumination radiation
BSref Reflected component (of the illumination radiation BS)
DS Detection radiation
BE Image plane
7 Specimen holder
7' Virtually displaced specimen holder 7
8 Liquid
9 Detector
9.1 Detector surface
10 Meniscus lens
11 Specimen stage
12 Correction element
13 Control unit
14 Objective drive
15 Laser module
16 Beam shaping
17 XY-scanner
18 Immersion medium
A1 First optical axis
A2 Second optical axis
$\alpha 1$ Angle (between first optical axis A1 and reference axis B)
$\alpha 2$ Angle (between second optical axis A2 and reference axis B)
d Distance, thickness
d' Displacement path
OS First side face, first interface (upper side)
US Second side face, second interface (lower side)
$\Delta y$ Path (in the direction of the Y-axis Y)

What is claimed is:

1. Method for determining the thickness of a specimen holder in the beam path of a microscope, said specimen holder being transparent to illumination radiation and embodied to receive a specimen, the method including the steps of:
    A: arranging the specimen holder, which has a first interface and a second interface, in a specimen plane, wherein the specimen plane is situated in an XY-plane that is spanned by an X-axis and a Y-axis of a Cartesian coordinate system,
    B: aligning the first interface and the second interface parallel to the specimen plane,
    C: directing at least one beam of the illumination radiation along a first optical axis onto the aligned specimen holder at an illumination angle,
    D: capturing at least two measurement values of a reflected component of the illumination radiation or at least two measurement values of a detection radiation caused by the illumination radiation, and
    E: establishing a spacing of the first and second interface in relation to each other in the direction of the Z-axis as a thickness depending on the at least two captured measurement values.

2. Method according to claim 1, further comprising actuating optically effective correction elements that are arranged in the beam path of the illumination radiation, in a beam path of the reflected component and/or in a beam path of the detection radiation depending on the established thickness and the relative positions thereof are set in the respective beam path.

3. Method according to claim 1, further comprising producing a light sheet in the specimen plane by means of the illumination radiation.

4. Method according to claim 1, wherein in step C, the illumination angle between the first optical axis and a reference axis perpendicular to the XY-plane is unequal to zero,
    in step D, a reflected component of the illumination radiation, which from the first side face or from the second side face of the specimen holder is captured in an intended relative position as a first measurement value by means of a detector and, subsequently, the specimen holder is displaced in the direction of the Z-axis, directed perpendicular to the XY-plane, until a reflected component of the respective other interface is captured in the intended relative position as a second measurement value by means of the detector and,
    in step E, a displacement path in the direction of the Z-axis is established on the basis of the first and second measurement value, said displacement path having been necessary to capture the reflected components of the first and second interfaces in the intended relative position, and the thickness is established.

5. Method according to claim 2, further comprising defining an image quality measure,
    modifying an actual manner of positioning of at least one of the correction elements, capturing measurement values of the image quality assigned to each of the chosen actual manners of positioning, establishing a current value of the image quality measure in each case on the basis of the measurement values of the image quality measure, and selecting an actual manner of positioning of the at least one correction element, at which a desired value of the image quality measure is present.

6. Method according to claim 5, wherein the measurement values use at least one of the image quality measures of contrast, a sharpness measure, signal-to-noise ratio, signal intensity and parameters of a point spread function.

7. Method according to claim 5, wherein by the use of the specimen containing separated punctiform fluorescence sources and capturing at least two measurement values of the image quality measure on the basis of the detection radiation of a number of the punctiform fluorescence sources.

8. Method according to claim 6, further comprising establishing a sharpness measure on the basis of an analysis of the spatial frequency space of a captured image by virtue of spatial frequency components of the captured image being subdivided into groups by means of a threshold value and a maximum or minimum of the spatial frequency components contained in the respective group being used as a sharpness measure.

9. Method according to claim 6, further comprising establishing the sharpness measure on the basis of an analysis of the fourth central moment of the spatial frequency spectrum (kurtosis) of a captured image by virtue of a low or minimal value of the kurtosis being selected.

10. Method according to claim 1, wherein the use of radiation with self-reconstructing beams or diffraction-free beams as illumination radiation.

11. Method for capturing image data of a specimen arranged in a specimen plane of a microscope, comprising steps A to E according to claim 1, and further comprising causing a detection radiation in the specimen by means of illumination radiation, and captured.

* * * * *